May 2, 1961  J. WITHERSPOON, JR  2,982,476
FLUID MIXING VALVES

Filed Aug. 18, 1958  2 Sheets-Sheet 1

May 2, 1961 J. WITHERSPOON, JR 2,982,476
FLUID MIXING VALVES
Filed Aug. 18, 1958 2 Sheets-Sheet 2
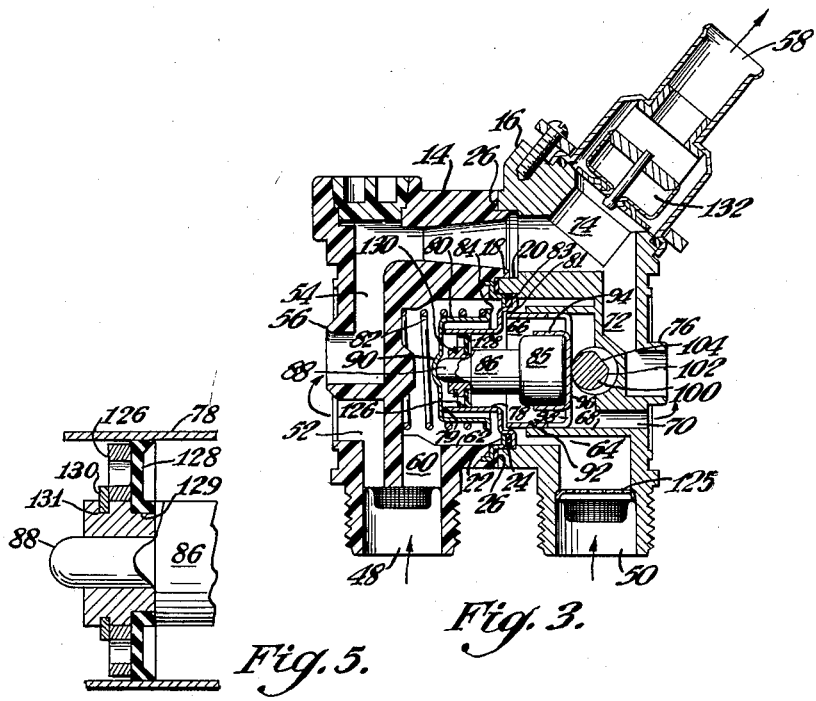
Fig. 3.
Fig. 5.
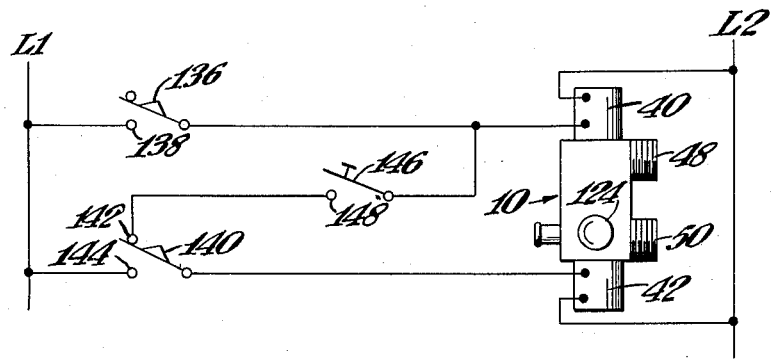
Fig. 4.

though it will be apparent to those skilled in the art that this invention is susceptible to a variety of uses, it has particular utility for controlling the flow of hot and cold water to a washing machine and accordingly will be explained as applied thereto.

United States Patent Office 2,982,476
Patented May 2, 1961

2,982,476
FLUID MIXING VALVES

Jack Witherspoon, Jr., Knoxville, Tenn., assignor to Robertshaw-Fulton Controls Company, Richmond, Va., a corporation of Delaware Filed Aug. 18, 1958, Ser. No. 755,619

4 Claims. (Cl. 236—12)

This invention relates to fluid mixing valves and more particularly to thermostatically controlled mixing valves wherein fluids of different temperature may be combined and delivered at preselected temperatures. Although it will be apparent to those skilled in the art that this invention is susceptible to a variety of uses, it has particular utility for controlling the flow of hot and cold water to a washing machine and accordingly will be explained as applied thereto.

It is an object of this invention to deliver water over an adjustable range of predetermined temperatures extending from that of a cold water supply to the temperature of a hot water supply.

Another object of this invention is to control the range of temperatures of the delivered water by simple and efficient adjusting means.

A further object of this invention is to prevent pressure unbalance between the hot and cold water supply lines from causing unwanted backflow.

Briefly stated, in a preferred embodiment of this invention, the temperature of water flowing from a mixing chamber is controlled by a thermally responsive power element which actuates a valve member to control the admission of cold water into the mixing chamber when the temperature of fluid therein exceeds a predetermined degree. Adjusting means are provided to control the position of the power element with respect to the valve member to vary the point at which cold water is admitted to the chamber and thereby vary the temperature of the delivered liquid. Additional valve means are provided to control the flow of liquid from a mixing chamber and the flow of liquid through a bypass so that water may be delivered at the temperature of the cold water supply, or at the temperature of the hot water supply, or at a preselected temperature therebetween.

Other objects and advantages will be apparent from the following description taken in connection with the drawings wherein:

Fig. 3 is a longitudinal sectional view through a portion of the device shown in Fig. 1;

Fig. 4 is a wiring diagram applied to the device shown in Fig. 1; and

Fig. 5 is an enlarged sectional view of a detail.

Figure 1:
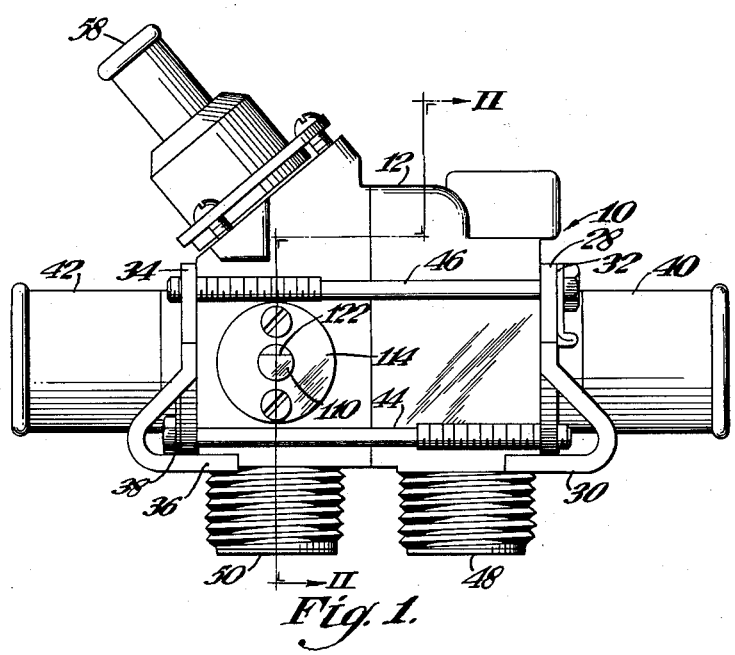
Fig. 1 is a front view of an embodiment of this invention.
Figure 2:
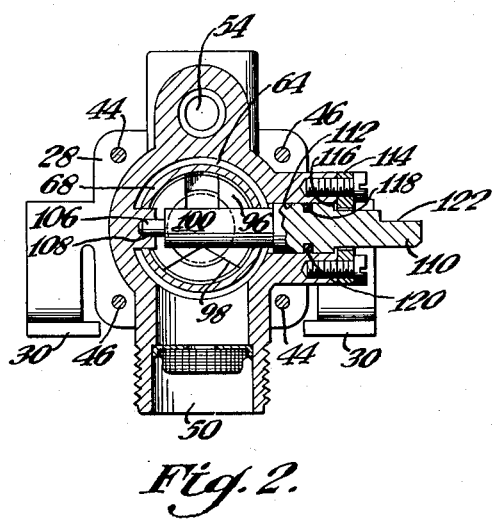
Fig. 2 is a sectional view along line II—II of Fig. 1.

As shown in the drawings, a mixing valve 10 is provided having a casing 12 formed of casing member 14 disposed in alignment with casing member 16 whereby a collar 18 formed on casing member 14 extends into a counterbore 20 formed in casing member 16. Casing member 14 is formed of a thermoplastic material, preferably nylon, and casing member 16 is preferably formed of an easily cast metal, such as brass or bronze. An annular step-ring 22, having a W-shaped radial cross-section, is partially embedded in casing member 14 and has a portion thereof which extends into counterbore 24 of casing member 16. A gasket 26 is formed having two apertures therein through which collar 18 and annular ring 22 extend to prevent fluid within casing 12 from leaking between casing members 14 and 16.

As best shown in Fig. 1, casing members 14 and 16 are held together by rectangular yoke members 28 and 34 which fit over end portions of casing members 14 and 16 and are held in place by a pair of tie-rods 46 and another pair of tie-rods 44. A conventional solenoid 40 is supported on one end of casing 12 by a plurality of tie-rods 46 passing through diametrically opposed apertures formed in a solenoid support base 32. Likewise, a conventional solenoid 42 is attached on the other end of casing 12 by a pair of tie-rods 44 extending through diametrically opposed apertures formed in a solenoid support base 38. Yoke 34 has a pair of support arms 36, extending from opposed sides thereon, which may have apertures formed therein for mounting valve 10 to a support means in a washing machine. Similarly, yoke 28 has a pair of support arms 30 extending therefrom.

Casing 12 is provided with a plurality of inlets comprising a cold water inlet 48 and a hot water inlet 50. A bypass is formed comprising passages 52 and 54 through which cold water may flow from inlet 48 directly to an outlet 58. To control the flow of fluid through this bypass, an annular valve seat 56 is formed between passage 52 and passage 54 which cooperates with a conventional valve member (not shown) which may be of the pressure operated type. When solenoid 40 is energized, an armature associated therewith (not shown) permits the valve member to open whereby cold water may flow through the bypass passages 52 and 54. A passage 60 also communicates with inlet 48 and extends into a bore 62 of casing 12 for conducting cold water thereinto.

An annular passage 64, formed between the walls of bore 62 and an annular collar member 68 which extends into the area enclosed by the walls of bore 62, communicates with a mixing chamber 66. Outlet means for mixing chamber 66 are formed comprising a passage 70 and a passage 72 through which a flow of fluid is controlled by a valve seat 76 cooperating in a manner similar to that described in connection with valve seat 56, with a valve member not shown, which is actuated by solenoid 42. An auxiliary mixing chamber 74 is formed at the intersection of passage 54 and the passage 72 and communicates with outlet 58.

A tubular valve seat member 78 is disposed within the interior of casing 12 and has at one end a stepped annular flange 81 disposed with the outer periphery thereof within counterbore 24 of casing member 16. Valve seat member 78 is held in place by a gasket 83 disposed between ring 22 and flange 81. The other end of valve seat member 78 forms a valve seat 79 which cooperates with a cup-shaped valve member 80 for controlling the flow of cold water from inlet 48 into mixing chamber 66. Valve member 80 is biased into engagement with the valve seat 79 by a helical spring 82 extending between casing 12 and a radially extending flange 84 formed on valve member 80.

A temperature responsive power element 86 is disposed within mixing chamber 66 in the path of fluid flowing therethrough and has a body portion 85 supported by a pair of tabs 94 bent out from the bottom of a cup-shaped throttling valve member 92 which is slidably disposed and in contact with the interior walls of collar 68. Power element 86 has a movable piston 88 which extends from body 85 and abuts depression 90 of valve member 80. Power element 86 is conventional and has a characteristic of being directly responsive to the temperature of an expansible substance enclosed therein whereby for any given temperature thereof, piston 88 extends from body 85 an amount proportional thereto. Increases in temperature cause piston 88 to extend further whereas decreases in temperature cause it to retract. Apertures 98 are formed in throttling valve 92 at the point where the tabs 94 were bent from bottom wall 96 and permit fluid to flow through the mixing chamber to outlet passage 70.

Adjusting means for controlling the position of power element 86 within casing 12 comprise a cam 100, formed with a curved surface 102 and a flat surface 104, mounted eccentrically with respect to the axis of a shaft 110. The inner end of cam means 100 is formed with a nipple 106 which is rotatably received in a recess 108 formed in casing 12. The outer end of cam means 100 comprises the shaft 110 which passes through an aperture 112 in casing 12 and has a reduced end received within a spacer ring 114 which cooperates with a shoulder 116 formed by the reduced end on shaft 110. The ring 114 is suitably connected to casing 12. The reduced end of shaft 110 is formed with a flat section 122 for mounting a knob 124 to permit manual rotation of cam means 100. Knob 124 may be calibrated and have indicia thereon which corresponds to a desired temperature setting.

It should be noted at this point that spring 82 acting through valve member 80 biases power element 86 and throttling valve 92 into engagement with cam means 100 whereby bottom section 96 acts as a cam follower and bears against the surface of cam means 100. Whereas power element 86 causes valve member 80 to move in the direction from closed to open, spring 82 acts as a return spring and moves valve member 80 from an open towards the closed position. The dimensions of these elements are such that power element 86 will never expand sufficiently under the temperatures encountered to cause valve member 80 to contact casing 12; thus, there is no requirement for an overrun spring.

With the normal household supply lines connected, the hot water pressure is sometimes higher than the pressure at the cold water inlet. To compensate such a pressure difference, a flow restrictor orifice plate 125 is disposed within hot water inlet 50 and works in conjunction with throttling valve member 92 to create a pressure drop between inlet 50 and mixing chamber 66. The throttling valve member 92 coacts with a portion of flange 81 of tubular member 78 at the point where passageway 64 communicates with mixing chamber 66. Movement of throttling valve 92 changes the distance between the throttling valve member 92 and flange 81, thereby changing the pressure drop through the orifice thus created. By proper dimensioning of the flow control orifice plate 124, of the flange 81 and throttle valve 92, the pressure of the hot water entering the mixing chamber 66 can be regulated so that for normal conditions it will not be greater than the pressure of any cold water which may enter mixing chamber 66.

However, should the pressure be higher because of unexpected pressure variations or because only hot water is flowing through mixing chamber 66, a check valve means is provided to prevent reverse flow of hot water into the cold water line. Thus, as shown more clearly in Fig. 5, an apertured flange 126 is mounted on the end of body 85 from which piston 88 of power element 86 extends. The outer periphery of flange 126 is slightly spaced from the inner wall of tubular member 78. A resilient annular check valve member 128 has its inner periphery secured within a groove 129 in body 85 and covers the apertures on the mixing chamber side of flange 126. The assembly of the flange 126 and valve member 128 is held in place by a snap-ring 130 secured within a groove 131 in body 85. The outer periphery of flexible member 128 closely contacts the inner wall of member 78 to form a seal for preventing hot water from leaking between the valve seat member 78 and flange 126. Thus, cold water may flow through the check valve means in one direction into the mixing chamber 66 whereas hot water is prevented from flowing in the reverse direction.

To further control the pressure and flow through mixing valve 10, a flow control valve indicated generally at 132 is disposed within outlet 58. This flow control valve 132 is conventional and regulates the flow volume and pressure delivered by mixing valve 10.

The cam 100, because of the shape of its surface and the degree of eccentricity thereof, provides an adjustment means whereby when cam follower 96 rests against the flat cam surface 104, the power element 86 is at an extreme position wherein the temperature of the hot water flowing through mixing chamber 66 is ineffective to open valve 80 whereby cold water may enter mixing chamber 66 to reduce the temperature thereof. Thus, by adjusting knob 124 to this position, only hot water will flow through mixing chamber 66 to outlet 58.

One possible arrangement for actuating mixing valve 10 when installed in a washing machine is schematically shown in Fig. 4. A washer timing mechanism not shown) actuates cam switch members 136 and 140 to control the flow of water through mixing valve 10 during the rinse and wash cycles respectively. A manually operated switch member 146 permits selective energization of both solenoids 40 and 42, or only solenoid 40, during a rinse cycle.

In operation, knob 124 is rotated to a setting corresponding to the desired wash water temperature causing cam means 100 to move power element 86 to a position where it will cause valve member 80 to admit sufficient cold water into mixing chamber 66 to bring the temperature of the water therein to that corresponding to the knob setting. During a washer cycle, cam switch member 140 is in engagement with contact 144 and creates a circuit between power lines L1 and L2 to energize solenoid 42. If cam means 100 is positioned so that cam follower 96 rests on flat portion 104, only hot water will flow through the mixing chamber, the expansion of power means 86 being insufficient to disengage valve member 80 from valve seat 79. If cam means 100 is set to a lower temperature, the initial surge of hot water through mixing chamber 66 will heat power element 86 causing piston 88 to extend and open valve member 80 against the bias of spring 82 to admit cold water. The valve member 80 will subsequently assume a steady state condition wherein water flowing from mixing chamber 66 is at the desired temperature and will flow through passage 70, valve seat 76, passage 72, mixing chamber 74, flow control valve 132 and outlet 58.

Upon reaching the rinse cycle, the washer timer will shift switch member 140 into engagement with contact 142 and will close switch member 136 upon contact 138. Current will flow through solenoid 40 causing the associated valve member to open to permit cold water to flow through the bypass. If manual switch 146 is closed upon contact 148, solenoid 42 will also be energized and water at the wash cycle temperature will flow and mix with cold water from the bypass in auxiliary mixing chamber 74. If switch 148 is not closed, solenoid 42 will not be energized and only cold water will flow during the rinse cycle.

It is understood that many changes may be made in the combination and arrangement of parts and in the details of construction within the scope of the appended claims without departing from the invention disclosed herein.

I claim:

1. In a mixing valve, the combination of a casing having a pair of inlet passages for different temperature fluids and an outlet for a mixture of said fluids, an annular partition carried by said casing adjacent one of said passages and defining a mixing chamber, a tubular member having a first valve seat positioned adjacent the other said passage and a second valve seat adjacent said partition, a first valve member cooperable with said first valve seat for controlling fluid flow from said other passage to said mixing chamber, a second valve member cooperable with said second valve seat for controlling fluid flow from said one passage to said mixing chamber, thermally responsive means including a body portion and a relatively movable portion operatively engageable with said valve members respectively, said body portion extending within said mixing chamber and being supported upon said second valve member for movement therewith, adjusting means operable between said partition and said second valve member for moving said thermally responsive means as a unit relative to said tubular member, and means operably associated with said first valve member for biasing said thermally responsive means and said second valve member into operative engagement with said adjusting means.

2. In a mixing valve, the combination of a casing having a pair of inlet passages for different temperature fluids and an outlet for a mixture of said fluids, an annular partition carried by said casing adjacent one of said passages and defining a mixing chamber, a tubular member having a first valve seat positioned adjacent the other said passage and a second valve seat adjacent said partition, a first valve member coaxial with said tubular member and cooperable with said first valve seat for controlling fluid flow from said other passage to said mixing chamber, a second valve member coaxial with said tubular member and cooperable with said second valve seat for controlling fluid flow from said one passage to said mixing chamber, thermally responsive means including a body portion and a relatively movable portion coaxial with said tubular member and operatively engageable with said valve members respectively, said body portion extending within said mixing chamber and being supported upon said second valve member for movement therewith, adjusting means including a cam element extending transversely of said tubular member between said partition and said second valve member and operable for moving said thermally responsive means as a unit relative to said tubular member, and means operably associated with said first valve member for biasing said thermally responsive means and said second valve member into operative engagement with said cam element.

3. In a mixing valve, the combination of a casing having a pair of inlet passages for different temperature fluids and an outlet for a mixture of said fluids, an annular partition carried by said casing adjacent one of said passages and defining a mixing chamber, a tubular member having a first valve seat positoned adjacent the other said passage and a second valve seat adjacent said partition, a first valve member cooperable with said first valve seat for controlling fluid flow from said other passage to said mixing chamber, a second valve member cooperable with said second valve seat for controlling fluid flow from said one passage to said mixing chamber, thermally responsive means including a body portion and a relatively movable portion operatively engageable with said valve member respectively, said body portion extending within said mixing chamber and being supported upon said second valve member for movement therewith, and check valve means operable between said other passage and said mixing chamber for preventing flow in one direction therebetween, said check valve means including a resilient element carried by said body portion in sealing engagement with said tubular member intermediate said first and second valve seats.

4. In a mixing valve, the combination of a casing having a pair of inlet passages for different temperature fluids and an outlet for a mixture of said fluids, an annular partition carried by said casing adjacent one of said passages and defining a mixing chamber, a tubular member having a first valve seat positioned adjacent the other said passage and a second valve seat adjacent said partition, a first valve member coaxial with said tubular member and cooperable with said first valve seat for controlling fluid flow from said other passage to said mixing chamber, a second valve member coaxial with said tubular member and cooperable with said second valve seat for controlling fluid flow from said one passage to said mixing chamber, thermally responsive means including a body portion and a relatively movable portion coaxial with said tubular member and operatively engageable with said valve members respectively, said body portion extending within said mixing chamber and being supported upon said second valve member for movement therewith, adjusting means including a cam element extending transversely of said tubular member between said partition and said second valve member and operable for moving said thermally responsive means as a unit relative to said tubular member, means operably associated with said first valve member for biasing said thermally responsive means and said second valve member into operative engagement with said adjusting means, and check valve means operable between said other passage and said mixing chamber for preventing flow in one direction therebetween, said check valve means including an apertured annular member and a resilient annular member carried by said body portion, said resilient member overlying said apertured member and extending into sealing engagement with the inner wall of said tubular member intermediate said first and second valve seats.

References Cited in the file of this patent

UNITED STATES PATENTS

| | | |
|---|---|---|
| 1,024,729 | Lawler | Apr. 30, 1912 |
| 1,244,184 | Dunwoodie | Oct. 23, 1917 |
| 1,879,344 | Lawler | Sept. 27, 1932 |
| 1,954,903 | Walker | Apr. 17, 1934 |
| 2,296,266 | Breckenridge | Sept. 22, 1942 |
| 2,381,146 | Wangenheim | Aug. 7, 1945 |
| 2,607,207 | Branson | Aug. 19, 1952 |
| 2,656,981 | Schoerner | Oct. 27, 1953 |
| 2,657,860 | Schmidt | Nov. 3, 1953 |
| 2,672,157 | Branson | Mar. 16, 1954 |
| 2,810,523 | Branson | Oct. 22, 1957 |